March 16, 1926.
J. B. HAYDEN ET AL
LUBRICATING DEVICE
Filed Sept. 14, 1923
1,576,822
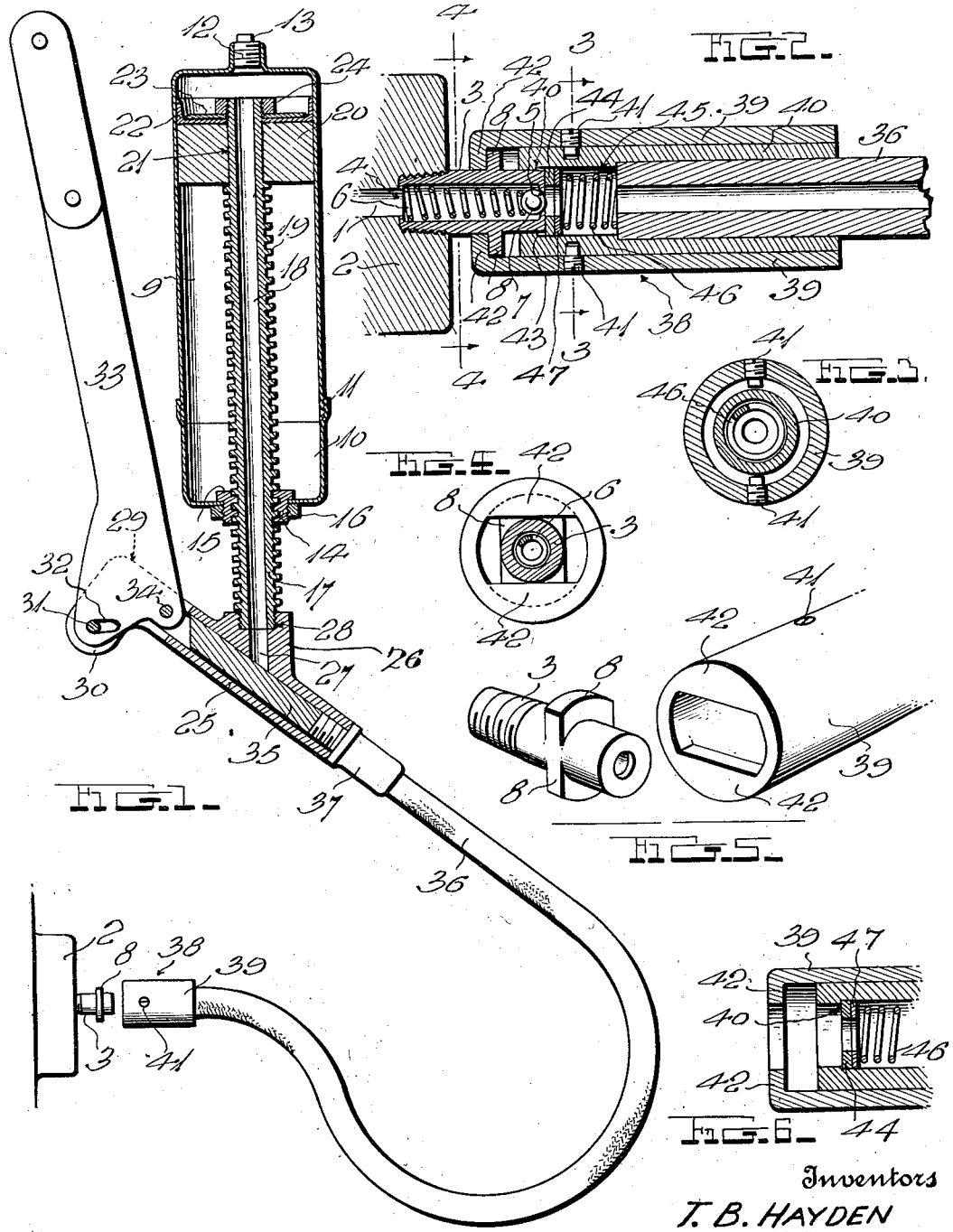
Inventors
T. B. HAYDEN
JOHN MORRIS
H. C. GEORGE
Witness
H. Woodard
By H. B. Wilson
Attorney Patented Mar. 16, 1926.

1,576,822

UNITED STATES PATENT OFFICE.

JOSEPH BENNETT HAYDEN, JOHN MORRIS, AND HARRY CLINTON GEORGE, OF GREENSBURG, PENNSYLVANIA.

LUBRICATING DEVICE.

Application filed September 14, 1923. Serial No. 662,674.

*To all whom it may concern:*

Be it known that we, JOSEPH BENNETT HAYDEN, JOHN MORRIS, and HARRY CLINTON GEORGE, citizens of the United States, residing at Greensburg, in the county of Westmoreland and State of Pennsylvania, have invented certain new and useful Improvements in Lubricating Devices; and we do declare the following to be a full, clear, and exact description of the invention, such as will enable others skilled in the art to which it appertains to make and use the same.

This invention relates to an improved lubricating device and one object of the invention is to provide a lubricating device by means of which lubricant may be initially fed towards the part to be lubricated from a low pressure cylinder and then forced into the part to be lubricated under high pressure.

Another object of the invention is to provide a lubricating device in which the low pressure cylinder may constitute a reservoir for carrying the main body of the lubricant and be carried by the high pressure device so that a quantity of heavy grease can be forced under low pressure into the high pressure cylinder without the main body of the grease being acted upon by high pressure and the grease to be applied to the part to be lubricated then forced from the high pressure cylinder through a tube leading to the part to be lubricated through the medium of a plunger reciprocating in the high pressure cylinder.

Another object of the invention is to provide a lubricating device in which the cylinder may be formed in two sections, one of which will have threaded engagement with a piston-carrying stem connected with the high pressure cylinder and the second of which may be bodily removed from the first to permit filling of the second section with the piston positioned entirely within the first section.

This invention is illustrated in the accompanying drawing, wherein:

Figure 1 is a view showing the improved lubricant applying device, the view being partially in longitudinal section and partially in side elevation.

Figure 2 is an enlarged sectional view through the means for connecting the hose with the part of the machine to be lubricated.

Figures 3 and 4 are transverse sectional views taken along the lines 3—3 and 4—4 of Fig. 2 respectively.

Figure 5 is a perspective view of the nipple to be applied to the part to be lubricated and a fragment of the coupling carried by the hose.

Figure 6 is a fragmentary longitudinal sectional view through the hose coupling.

This improved lubricating applying device is for use in applying heavy grease to a machine to be lubricated and will be so constructed that the heavy grease can be forced through the lubricant inlet 1 of a bearing 2 under very high pressure. In order to connect the hose of the device with the bearing, there has been provided a nipple 3 which is hollow and has a threaded end portion to be screwed into the outer end portion of the lubricant passage 1. This nipple has been provided with inturned flanges at its inner and outer ends, thus forming seats 4 and 5, one of which will form an abutment flange or seat for the inner end of the spring 6 and the other of which will form a seat for the ball valve 7 positioned in this nipple and yieldably held in engagement with the seat 5 by the spring 6. Side arms or lugs 8 extend from opposite sides of the body of the nipple 3 as shown in Figs. 2 and 5, so that the nipple may be firmly but releasably engaged by a coupling to be hereinafter described.

The grease which is to be applied to the bearing 2 is stored in a cylindrical container 9, the lower end portion 10 of which is formed separate from the main body thereof and releasably connected therewith by means of a threaded joint 11. It will thus be seen that when desired, this cylinder 9 may be removed from the cup or lower end portion 10 and filled with grease by being driven downwardly into a mass of grease. An air vent 12 which is normally closed by a threaded plug 13 has been provided so that when the cylinder is being filled, the plug can be removed and the air in the cylinder permitted to escape through the vent 12. After the cylinder has been filled, the plug will be replaced. The cup 10 has been provided with a central opening in which is positioned an internally threaded nut 14, the inner end portion of which is provided with an outstanding collar 15 to engage the inner face of the cup head and the outer end portion of which is externally threaded and engaged by a securing nut 16. This securing nut 16 engages the outer face of the cup head and serves to securely hold the nut 14 in place and provide a very tight connection between the coupling and the head of the cup about the opening through which the nut extends.

The piston rod 17 is externally threaded for engagement with the threads of the nut 14 and is provided with a longitudinally extending grease passage 18 through which the grease will pass when the cylinder is rotated to move the cylinder longitudinally of the piston rod towards the outer end thereof. The heavy threads 19 which engage with the threads of the nut 14 terminate in spaced relation to the outer end of the piston rod and they also terminate in spaced relation to the inner end thereof. The piston block 20 which is quite thick is positioned upon the unthreaded inner end portion 21 of this piston rod and rests against the inner end of the heavy thread 19. A pump cup 22 fits upon the unthreaded end portion 21 of the piston rod and against the piston 20 and a metal washer 23 is then put in place and engaged by a securing nut 24 which is screwed upon the end of the piston rod. It will thus be seen that the piston, pump cup and washer which retains the cup in the proper shape will be firmly held in place. It should be further noted that the distance between the lower end face of the piston 20 and the edge of the annular wall of the pump cup 22 is no greater than the distance between the bottom of the cup 10 and the internally threaded coupling collar 11. Therefore, when the cylinder 9 is to be filled with grease, the entire piston can be positioned in the cup 10 and the cylinder 9 can be removed and refilled and then replaced very easily and without interference by the flaring walls of the pump cup.

The grease which is forced from the low pressure cylinder is to be acted upon by a high pressure cylinder and thus forced under high pressure into the bearing without the main body of the grease in the low pressure cylinder being subjected to a high pressure. This high pressure cylinder is open at its end and intermediate its length has been provided with a side extension 26. In this extension 26, there has been provided a grease inlet passage 27 which leads from a threaded socket 28 into which is screwed the lower end portion of the piston rod 17.

When this piston rod is screwed into the side extension 26, the grease passage 27 will form a continuation of the passage 18 so that when the cylinder 9 is turned and moved downwardly upon the piston rod, the grease which is in this cylinder 9 above the piston will be forced through the passages 18 and 27 into the cylinder 25. At its rear end, the cylinder 25 has been provided with spaced arms 29, the free end portions 30 of which extend downwardly and are provided with alined openings to receive a pivot pin 31 which extends through a slot 32 in the handle 33 and thus slidably and pivotally mounts the handle between the arms 29. This handle has a flared lower end portion forming a wide foot piece in the rear end portion of which the slot 32 is formed and in the forward end portion of which there has been provided an opening to receive a pivot pin 34 which serves to pivotally connect the handle with the rear end portion of the plunger 35 of the high pressure pump. This plunger 35 slides longitudinally in the cylinder 25 and when the handle is swung upon the pivot pin 31, this plunger will have movement in the cylinder 25 from a position with its forward end to the rear of the inlet port 27 to the position shown in Fig. 1. It will thus be seen that with the plunger drawn rearwardly, the cylinder 9 may be turned to force the grease under low pressure into the forward end portion of the cylinder 25 and this grease in the forward end portion of the cylinder 25 then expelled from the same under high pressure by means of the plunger 35 and handle 33 and this grease forced into the hose 36 which is connected with the forward end portion of the cylinder 25 by means of a conventional type of coupling 37. This hose 36 will be of any suitable length so that with the cylinder 25 mounted at any convenient point where it may be held firmly in place, the coupling which is provided at the free end of the hose and indicated in general by the numeral 38 may be securely but releasably connected with a nipple of any bearing upon the automobile or other machine to be lubricated. It will of course be understood that one of the nipples 3 will be provided for each bearing and that the coupling 37 will be applied to the various bearings as they are to be filled with the lubricant.

The coupling which is preferably used will be formed as shown clearly in Fig. 2 and will be provided with an outer casing 39 and an inner sleeve 40 which will be firmly secured upon the free end portion of the hose 36 in any suitable manner desired and will fit snugly in the tubular casing 39. Fastener screws 41 have been provided so that the sleeve may be firmly held in place in the casing with its inner end in spaced relation to the shoulders 42 provided at the forward end of the casing 39. From an inspection of Fig. 5, it will be seen that these shoulders 42 provide an opening in the forward end of the casing through which the outer end portion and arms 8 of the nipple 3 may pass and the coupling then turned to position the arms 8 in crossed relation to the shoulders 42 as shown in Fig. 2. The forward or inner end portion of the sleeve 40 is inwardly thickened to provide a reduced pocket having a shoulder 43 adjacent its forward end to be engaged by a gasket 44 which is slidably mounted in the pocket 45 and normally held against this shoulder by a spring 46. A washer 47 has been provided between the spring 46 and gasket 44 so that the gasket may be firmly held in place and prevented from becoming distorted when the spring is under pressure. From an inspection of Fig. 2, it will be seen that when the coupling is placed in engagement with the nipple 3, the outer end portion of the nipple will pass into the forward end portion of the sleeve 40 and by engaging the gasket 44 will tend to move the gasket and washer towards the hose 36 and thus cause the spring to have a tendency to move the nipple out of the coupling. This however is prevented by the arms 8 engaging the inner faces of the shoulders 42 and the spring will therefore serve to firmly hold the coupling in engagement with the nipple and further serve to hold the gasket in tight engagement with the end of the nipple and cause all of the grease to be forced through the nipple and prevent it from working around the nipple.

When this device is in use, it will be mounted at any convenient point upon the automobile or in a work-shop upon a work-bench or movable carrier. When it is desired to lubricate the bearings of the automobile, the coupling 39 will be successively engaged with the nipple 3 provided upon the bearing. After the coupling has been connected with one of the nipples, the cylinder 9 will be turned so that it will be moved towards the cylinder 25 and grease will be forced through the hollow piston rod and into the cylinder 25. The hose will of course be full of grease and only enough grease will be forced under low pressure into the cylinder 25 to fill the cylinder between the inner end of the piston or plunger 35 and the body of the grease in the hose. The handle 33 will now be swung in an operative direction and the plunger will be forced inwardly, thus exerting a high pressure upon the grease and forcing this grease from the hose through the valve-controlled inlet nipple 3 into the bearing. If additional grease is necessary to completely lubricate the bearing, the lever-hand 33 will be swung away from the cylinder 9 to draw the plunger outwardly of the cylinder 25 and the cylinder 9 again operated to refill the cylinder 25 and take the place of the grease which has been forced through the cylinder and hose into the bearing. The lever handle will then again be swung in an operative direction and additional grease forced into the bearing. This can be repeated until a sufficient quantity of grease has been forced into the bearing to fill the same. It will thus be seen that a large quantity of grease can be very easily forced into a bearing. When the device is first put in operation, it will of course be understood that the cylinder 9 will be filled with grease and then turned in an operative direction until the grease has been forced through the cylinder 25 and completely fills the hose. When the supply of grease in the cylinder 9 is exhausted, the plug 13 will be removed to prevent the formation of a vacuum in the upper portion of the cylinder and the cylinder then turned to move it upwardly upon the piston rod and position the piston entirely within the lower end portion of the cylinder. The cylinder will then be unscrewed from this lower end portion or cup 10 and will be filled with grease. The plug 13 will then be replaced and the cylinder again screwed into engagement with the cup 10.

We claim:

1. In a grease gun, a grease ejecting device including a stationary body and a movable ejector; a tubular feeder section rigidly joined to said body, a rotatable grease cylinder around said rigid tubular feeder section and adapted to be held in one hand and rotated by the same hand, said cylinder constituting a main supporting handle for the gun, means operatively associated with said tubular feeder section and said cylinder for feeding grease through the former to the ejecting device when said cylinder is rotated, and an operating lever fulcrumed to the aforesaid body for operating said ejector, said lever being laterally spaced from said rotatable grease cylinder, being movable toward and from said cylinder and being adapted to be held in the user's other hand while holding the grease cylinder in the one hand, whereby movement of the two hands toward each other will eject the grease from the ejecting device, mere rotation of said grease cylinder without removal of either hand from the part grasped thereby serving to feed an additional quantity of grease to said ejecting device.

2. A lubricating device comprising a high pressure cylinder having a grease inlet and an outlet, a grease ejecting plunger in said cylinder, a heavy tubular piston rod rigidly connected to said cylinder in communication with said grease inlet, said tubular piston rod having a piston on its outer end, an elongated low pressure grease cylinder containing said piston and having a threaded connection with said piston rod, and a plunger-operating lever fulcrumed to the high pressure cylinder and operatively connected with said plunger, said lever being adapted to be held in one hand and forced toward the low pressure cylinder, the latter being then adapted to be held in the other hand and turned after each projection and retraction of the plunger to force grease into the high pressure cylinder.

In testimony whereof we have hereunto affixed our signatures.

JOSEPH BENNETT HAYDEN.
JOHN MORRIS.
HARRY CLINTON GEORGE